United States Patent Office 2,749,604
Patented June 12, 1956

2,749,604

PRODUCTION OF METALLIC BODIES

Aubrey Latin, London, England, assignor to The Okonite Company, Passaic, N. J., a corporation of New Jersey No Drawing. Application April 22, 1952,
Serial No. 283,751

2 Claims. (Cl. 29—420.5)

This invention relates to the production of metallic bodies from mixtures of metal powders and has for its main, though not its sole object, the production from such powders of extruded bodies of indefinite length, for instance metal tubing and metals sheaths of or for electrical cables.

In accordance with the present invention I produce metallic bodies by making a mixture comprising powdered aluminium and powdered lead and compacting and mechanically working the mixture to bring about cohesion of the constituent particles and convert the mass into a metallic body of the required form. In accordance with a further feature of this invention this metallic body may be a tube or a cable sheath.

At present electric cables are most commonly sheathed with lead or aluminium. The former metal although heavy and mechanically weak is pliable, comparatively easy to extrude and is resistant to corrosion. Aluminium is much lighter and stronger but is much more difficult to extrude directly on to a cable core without overheating the core. The present invention enables a cable sheath to be produced possessing to some extent the advantages of a lead sheath as regards ease of extrusion and to some extent the advantages of an aluminium sheath as regards lightness and mechanical strength. This improved sheath consists of a compacted and mechanically worked mixture of powdered metallic particles forming an alloy consisting wholly or mainly of lead and aluminium in microscopically heterogeneous mixture. The provision of a lead aluminium alloy cable sheath constitutes a technical advance in the art of cable manufacture for such sheaths have not hitherto been practicable owing to the difficulty of alloying lead and aluminium together by ordinary methods.

The process in accordance with the invention is applicable to the production of a wide range of lead-aluminium alloys. In carrying out the process the proportions of aluminium and lead powders to be used will be chosen to suit the purpose for which the product is to be used. For instance, lead-rich metallic bodies, may be produced in which the aluminium content may range from about 0.5% to about 15% by weight (about 2% to about 42% by metal volume), and aluminium-rich metallic bodies may be produced in which the lead content may range from about 5% to about 50% by weight (about 1% to about 19% by metal volume). Metallic bodies within the first range may be used in place of lead for many purposes as the presence of the aluminium component results in a body that is harder and stronger than lead and has a greater creep resistance. For instance, a metallic body in accordance with the invention containing only 5% by weight of aluminium (22% by volume) has an ultimate tensile strength that is 50% (or more) higher than that of a typical cable sheath lead alloy and a steady stage creep rate of the order of ⅛ that of such alloy. Metallic bodies within the first range may therefore be used in place of lead and the usual lead alloys to provide lead alloy cable sheaths of greater mechanical strength than those in general use.

Metallic bodies within the second range, that is the aluminium-rich range, can be obtained that have ultimate tensile strengths that compare favourably with that of aluminium of commercial purity, that are reasonably ductile, and in some cases are extrudable at temperatures that enable them to be used for the manufacture of cable sheaths by extrusion directly on to cable core.

With the object of improving the structure and properties of the alloys produced, one or more other metals of a suitable kind may be added to the powder mixture before compacting it. Suitable metals for this purpose include tin, lithium, magnesium, titanium, zinc, antimony and bismuth. These metals have either atomic radii between those of lead and aluminium or have other properties which cause them to alloy effectively with lead or aluminium, and effect improvements in bonding between particles or other qualities of the final alloys. The amount of such metal or metals that may be so added may comprise up to 5% by weight of the whole mixture, the amount depending inter alia on the particular metal or group of metals added; for example in the case of tin or magnesium which form low melting point alloys with lead, the amount used will in general be less than 1% of the amount of lead present, more particularly when these elements are separately added. The additional metal may be added as a powder or powders to the lead and aluminium powders or may first be alloyed with a portion of the lead or aluminium, the alloy being reduced to powder and added in that form.

Powdered aluminium of commercial purity, that is of a purity between 99.0% and 99.8%, may generally be used but for some purposes it may be desirable to use aluminium having a purity higher than 99.8%. The aluminium and lead powders may be of any normal form but preferably an atomized powder is used in each case. The particle size of the powder used may vary. A satisfactory aluminium powder for most purposes is a powder of —240 mesh grade, that is a powder that passes through a sieve having 240 meshes per inch (as specified in British Standards Specification No. 481—1933) but coarser or finer powders are also practicable though better results will be obtained by using finer particles. For the lead-rich mixtures especially, I prefer to use an elutriated atomized powder of—300 mesh grade or finer. The particle size of the lead powder may be somewhat greater without detriment to the resulting alloy product but where coarse grade lead powder is used I prefer to employ a mixing process which results in the breaking up of the lead particles. A mixing process which has proved to be very satisfactory in this respect consists in mixing the aluminium and lead powders in a ball mill containing steel or porcelain balls of suitable size and small pieces of hard aluminium sheet, for example in a mill which contains balls of about one-half of an inch in diameter and hexagonal pieces of aluminium having a diameter of about 0.75 inch and a thickness of about 0.024 inch, and runs at a speed of about 80 R. P. M. Any work-hardening of the aluminium particles which may occur can be removed during the subsequent compacting process, providing that aluminium having a sufficiently low recrystallisation temperature is used.

Homogeneous mixes have been readily obtained by mixing the constituents in a dry state according to the above procedure but if desired small amounts, for example about 0.5% by weight, of an organic binding medium, for instance lauryl alcohol, may be added to assist in obtaining a uniform mix.

It is probable that oxide coatings will be present on some of the metal particles, in particular on the aluminium particles, before compacting takes place. Generally, these oxide coatings do not appear to be a source of weakness of any consequence. Certainly, as will appear from the test results quoted below, products of reasonably good tensile strength can be obtained without taking any steps to remove such coatings before compacting. The presence of oxide films on the aluminium particles does however appear to harden the resulting aluminium-lead alloy. For some purposes this may be a disadvantage and when this is so, as it is for instance when particularly low extrusion temperatures of the aluminium-rich mixes are required, precautions may be taken during the production and storage of the aluminium powder to prevent the formation of such films to any material extent or steps may be taken to eliminate oxide films before or during the operation of mixing the aluminium and lead powders.

The subsequent steps of the process, namely the operations of compacting and mechanically working the mixture of aluminium and lead powders to bring about alloying of the constituent particles and convert the mass into a metallic alloy body of the required form, may be separate or they may to some extent merge one into the other. In the former case, the lead and aluminium powders, after having been thoroughly mixed together, may be compacted to form a billet which is subsequently worked, as by a forging, hammering, rolling or extruding operation. In the latter case, the powder mixture may be fed into the receiver of a suitable press, for instance, a reciprocating ram press and there be compacted into a coherent body and extruded. During its passage through the extrusion press the material, whether it has been pre-compacted or has become compacted within the press, is subjected to the required degree of mechanical working to induce binding of the lead and aluminium particles and issues as an extruded alloy body of indefinite length. In both cases the result is a shaped body of a metallic material having to a large extent the properties of a lead-aluminium alloy.

Compacting of the mixture of lead and aluminium powders to form a billet may take place at ambient or at raised temperatures but heating materially assists the compacting process. The compacting pressure required to produce a billet capable of being handled will depend upon the size of the billet, the quality and composition of the powder mixture and the temperature at which compacting is carried out. At compacting temperatures ranging from ambient temperatures up to 300° C., pressures ranging from 10 to 20 tons/sq. inch have been found to give satisfactory results in the case of small billets having a diameter of between one and two inches. Compacting conditions that have been found to be generally satisfactory for both ranges of aluminum-lead mixtures include a compacting temperature of 250° C. and a pressure of 20 tons/sq. inch. Under these conditions and with a compacting time of 15 minutes billets having a diameter of about 1¾" and a length of 3" have been obtained which have good strength and considerable malleability, such billets having, when the lead content ranges from 10 to 50% by weight, a Vickers Pyramid hardness number of between 20 and 30 with a load of 2½ kg., which compares with a figure of 27 for a solid billet of aluminium of 99.5% purity (designated E1B in B. S. 1476.) For the production of larger billets either the pressure employed or the time involved, or both, may need to be varied.

The pressures for the working operation, or for the compacting and working operations in the case where these merge, will depend upon the nature and composition of the mixture, upon the temperature at which the operation or operations are carried out and upon the nature of the operation or operations. For instance, where working of the mixture is effected by extrusion the extrusion pressure will depend, inter alia, upon the extrusion ratio used, that is, upon the ratio between the cross-section of the compacted billet (or, where the mixture is introduced into the press in powder form, of the receiver) and the cross-section of the extruded body. Optimum working conditions for particular mixtures may readily be determined experimentally. For lead-rich mixtures, the extrusion ratio may be high, for example 400:1 or a corresponding degree of working may be obtained by making the billet of much greater cross-section than the receiver of the press and then reducing it as by rolling or extruding, to give it a diameter corresponding to that of the receiver of the press by which it is given its final shape. Where a high ratio extrusion press is used the lead-rich powder mixture may be charged into the press receiver on to the top of the slug of the previous billet and the operations of compacting and extruding the mixture be combined.

In the case of aluminium-rich mixtures the use of such high extrusion ratios is difficult when low extrusion temperatures are required. When temperatures in excess of 400° C. are used extruded products can be obtained direct from powder charges or from compacted billets. For temperatures lower than this, and in particular beneath 320° C., sounder and more reliable extruded products are obtained if the billets are subjected to a pre-sintering process before being extruded or otherwise reshaped. Such pre-sintering of the billet eliminates the splitting of the extruded product due to the release of elastic stresses which has been found occasionally to occur when billets of aluminium-rich aluminium-lead powder mixtures are extruded at low temperature without such treatment. It may also be applied to billets of lead-rich aluminium-lead mixtures.

A pre-sintering treatment giving very satisfactory results where the lead content does not exceed 50% by weight comprises maintaining the billet at a temperature of 450° C. for a period which in the case of billets of the size previously mentioned is six hours. Although the melting point of lead is exceeded, exudation is not excessive where the lead content is below 50% by weight and, in all cases, can be allowed for. An alternative treatment which is more expeditious and more effective than that above described and affords protection against oxidation is treatment to a higher temperature in a lead bath, for instance, treatment at 600° C. for a period of about 5 hours. Other pre-sintering treatments possible comprise heating in an inert atmosphere and heating in a salt bath.

The folowing comparative tests are quoted to show how the extrudability of the aluminium-rich aluminium-lead powder alloys varies with the lead content. In all cases the aluminium powder used was of 99.7% purity and the mixture was compacted at 250° C. under a pressure of 20 tons/sq. inch to form billets of 1¾ inches diameter and 3 inches in length which were pre-sintered in air at 450° C. and extruded at 295° C. under an extrusion pressure of 20 tons/sq. inch, the extrusion ratio being about 30:1.

| Percent of lead | | Extrusion Speed in inches/ minutes |
|---|---|---|
| by weight | by volume | |
| 0 | 0 | 0.05 |
| 15 | 4 | 0.10 |
| 30 | 9.3 | 0.20 |
| 50 | 19.0 | 1.5 |

No special steps were taken to eliminate oxide films from the aluminium particles. With the elimination of such films speeds of extrusion may be anticipated which are, under the same conditions as regards extrusion temperature and pressure, materially greater than those given and in some cases are considerably greater than those obtainable using solid billets of 99.7% aluminium. The term solid billet is here used to mean a billet made by casting molten aluminium as distinguished from a billet made by compacting powdered aluminium and sintering the compacted body. Accordingly the possibility is presented of obtaining extruded bodies of aluminium-lead alloy at temperatures below the usual extrusion temperatures of commercial aluminium.

The following table provides an indication of the tensile strength and ductility of some examples of aluminium-rich alloys manufactured in accordance with the present invention. Tests were in all cases taken on test pieces made from extruded rod of 0.3 inch diameter extruded at 295° C. under an extrusion pressure of 20 tons/sq. inch the extrusion ratio being 30:1.

| Test Piece No. | Pb content, percent by weight | Billet History | Ult. tensile strength in tons/sq. inch | Percent Elongation |
|---|---|---|---|---|
| 1 | 0 | Super-purity solid aluminium rod. | 5.5 | 40. |
| 2 | 0 | −100 mesh powdered Aluminium 99.7% purity compacted at 250° C. and sintered in air at 450° C. | 8.05 | Circa 25. |
| 3 | 10 | Al as above plus lead powder of −100 mesh compacted and sintered in air at 450° C. | 7.62 | 30.9. |
| 4 | 15 | Super pure Al filings of −100 mesh grade plus finely atomised lead powder of −240 mesh grade compacted and sintered in air at 450° C. | 7.63 | 25.3. |
| 5 | 15 | 99.8% Al filings of −100 mesh grade plus Atomized Lead powder of −240 mesh grade. Compacted and sintered in air at 450° C. | 6.87 | Approx. 20 |
| 6 | 15 | 99.7% Al filings of −100 mesh grade + atomised lead powder of −240 mesh grade. Compacted, and sintered in air at 450° C. | 7.3 | 20. |
| 7 | 30 | 99.7% Al filings of −200 mesh grade + lead of −100 mesh grade. Compacted, and annealed in lead bath at 600° C. | 8.2 | Approx. 10. |
| 8 | 50 | 99.7% Al in form atomised powder of −200 mesh grade plus atomised lead powder of −240 mesh grade. Compacted, and annealed in lead bath at 450° C. | 4.8 | Ductility rather poor. |

From the above tables it will be appreciated that by the present invention it is possible to obtain aluminium-rich lead-aluminium mixtures that are extrudable at a sufficiently low temperature and yield extruded products possessing the requisite mechanical properties to enable them to be used for the production of cable sheaths by direct extrusion on to the cable core. To this end the compacted billets may be placed in a billet extrusion press in which they are subjected to mechanical working and from which the metal is extruded through an annular extrusion orifice to form a sheath about a cable core fed through the head of the press.

The figures quoted in the above table for ultimate tensile strength and elongation of the various examples of alloy can be considerably improved upon and extruded products exhibiting better bending properties obtained by mechanically working the billet before extrusion, by the use of high extrusion ratios or by re-extruding one or more times, each of which improves the distribution of the lead particles in the aluminium and refines the structure in general.

This application is a continuation in part of my copending application Serial No. 244,104, filed August 28, 1951 now abandoned.

What I claim is:

1. The method which comprises making a mixture comprising powdered aluminum and powdered lead in which the lead content may range from about 5% to about 50% by weight, compacting the mixture at a temperature of around 250° C., and then extruding at around 295° C. at an extrusion pressure of 20 tons per square inch, the extrusion ratio being about 30:1.

2. The method which comprises making a mixture comprising powdered aluminum and powered lead in which the lead content may range from about 5% to about 50% by weight, compacting the mixture at a temperature of around 250° C. and under pressure of 20 tons per square inch, and then extruding at around 295° C. at an extrusion pressure of 20 tons per square inch, the extrusion ratio being about 30:1.

References Cited in the file of this patent

UNITED STATES PATENTS

| | | |
|---|---|---|
| 867,658 | Hoopes | Oct. 8, 1907 |
| 1,705,057 | Brandus | Mar. 12, 1929 |
| 1,748,037 | Leach | Feb. 18, 1930 |
| 1,913,133 | Stout | June 6, 1933 |
| 1,959,775 | Wilhearm | May 22, 1934 |
| 2,097,502 | Southgate | Nov. 2, 1937 |
| 2,168,381 | Woodford | Aug. 8, 1939 |
| 2,192,792 | Kurtz | Mar. 5, 1940 |
| 2,215,476 | Peters | Sept. 24, 1940 |
| 2,239,144 | Dean | Apr. 22, 1941 |
| 2,271,960 | Taylor | Feb. 3, 1942 |
| 2,284,670 | McCullough | June 2, 1942 |
| 2,303,869 | Quinlan | Dec. 1, 1942 |
| 2,391,752 | Stern | Dec. 25, 1945 |
| 2,519,918 | Merrill | Aug. 22, 1950 |